United States Patent
Dirneder et al.

(10) Patent No.: US 10,525,625 B2
(45) Date of Patent: Jan. 7, 2020

(54) PLASTICIZING UNIT INCLUDING A THERMAL SEPARATING DEVICE AND AN ACTIVE TEMPERING DEVICE

(71) Applicant: ENGEL AUSTRIA GmbH, Schwertberg (AT)

(72) Inventors: Franz Dirneder, Schwertberg (AT); Friedrich Johann Kilian, Neuhofen/Krems (DE); Florian Porod, St. Valentin (AT); Robert Strasser, Langenstein (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 0 days.

(21) Appl. No.: 15/484,443

(22) Filed: Apr. 11, 2017

(65) Prior Publication Data
US 2017/0291342 A1 Oct. 12, 2017

(30) Foreign Application Priority Data

Apr. 12, 2016 (AT) .............................. A 50314/2016

(51) Int. Cl.
*B29C 45/74* (2006.01)
*B29C 48/80* (2019.01)
*B29C 45/47* (2006.01)
(Continued)

(52) U.S. Cl.
CPC .............. *B29C 45/74* (2013.01); *B29C 45/47* (2013.01); *B29C 48/83* (2019.02); *B29C 45/1777* (2013.01); *B29C 45/62* (2013.01)

(58) Field of Classification Search
CPC ......... B29C 45/74; B29C 45/47; B29C 45/62; B29C 45/1777; B29C 45/72; B29C 48/80; B29C 48/83; B29C 45/1781
See application file for complete search history.

(56) References Cited

U.S. PATENT DOCUMENTS 2,198,703 A * 4/1940 Lawyer ................... B29C 45/74
219/421
2,233,558 A * 3/1941 Shaw ................... B29C 45/1775
219/421
(Continued)

FOREIGN PATENT DOCUMENTS

DE 3504773 8/1986
DE 20 2006 012 268 4/2007
(Continued)

OTHER PUBLICATIONS

Search Report dated Feb. 21, 2017 in Austrian Application No. A 50314/2016, with English translation.

*Primary Examiner* — Charles Cooley
(74) *Attorney, Agent, or Firm* — Wenderoth, Lind & Ponack, L.L.P.

(57) ABSTRACT

A plasticizing unit for a molding machine includes a plasticizing cylinder, and the plasticizing cylinder has a feed zone and a filling opening for material to be plasticized. The filling opening is arranged adjacent to the feeding zone, and a thermal separating device is arranged between the feed zone and the filling opening. An active tempering device for the filling opening is provided, and the active tempering device includes at least one tempering conduit and a tempering medium turbulently flowing through the tempering conduit during operation of the active tempering device.

18 Claims, 8 Drawing Sheets

(51) Int. Cl.
*B29C 45/62* (2006.01)
*B29C 45/17* (2006.01)

(56) References Cited

U.S. PATENT DOCUMENTS

| | | | | |
|---|---|---|---|---|
| 2,436,999 | A * | 3/1948 | MacMillin | B29C 45/74 |
| | | | | 106/DIG. 7 |
| 3,181,200 | A | 5/1965 | Joseph | |
| 4,395,376 | A * | 7/1983 | Matthews | B29C 45/1634 |
| | | | | 264/245 |
| 4,678,420 | A * | 7/1987 | Inoue | B29C 45/18 |
| | | | | 425/144 |
| 4,759,181 | A * | 7/1988 | Biritz | F01N 3/046 |
| | | | | 123/41.08 |
| 7,249,940 | B2 * | 7/2007 | Senda | B29O 45/74 |
| | | | | 425/143 |
| 9,931,773 | B2 * | 4/2018 | Fitzpatrick | B29C 45/18 |
| 2004/0258786 | A1 * | 12/2004 | Senda | B29C 45/74 |
| | | | | 425/143 |
| 2007/0087080 | A1 | 4/2007 | Weinmann | |
| 2010/0046317 | A1 | 2/2010 | Grunitz | |
| 2017/0030655 | A1 * | 2/2017 | Hart | F28D 15/0275 |
| 2017/0291342 | A1 * | 10/2017 | Dirneder | B29C 45/47 |

FOREIGN PATENT DOCUMENTS

| | | |
|---|---|---|
| DE | 10 2010 053 633 | 6/2011 |
| JP | 6-92097 | 11/1994 |
| JP | 8-238657 | 9/1996 |
| KR | 10-2013-0080318 | 7/2013 |
| WO | 2005/023507 | 3/2005 |
| WO | 2008/000613 | 1/2008 |

\* cited by examiner

Fig. 8
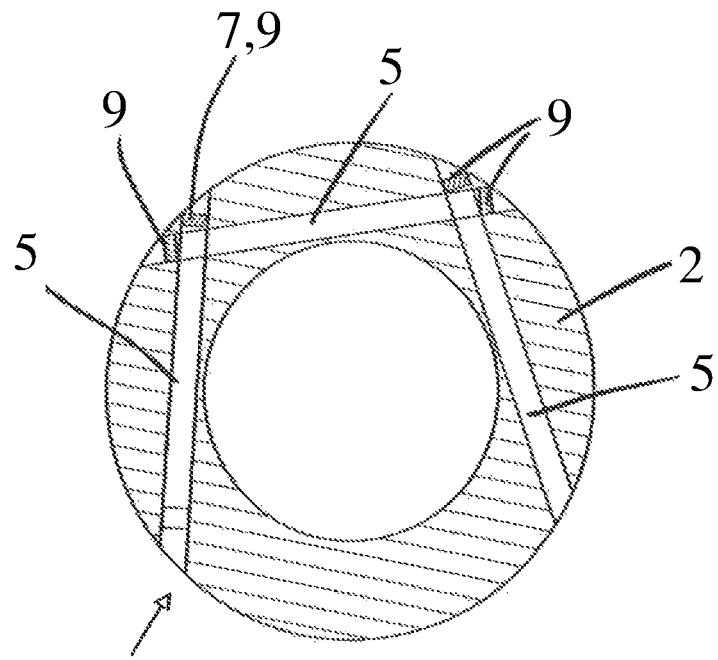
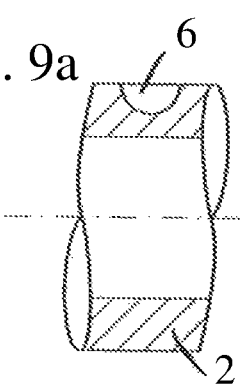
Fig. 9a
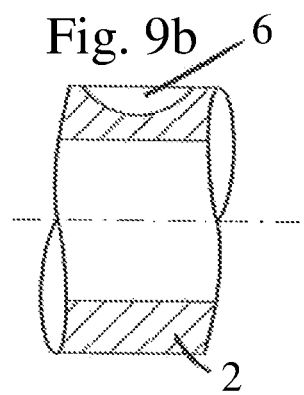
Fig. 9b
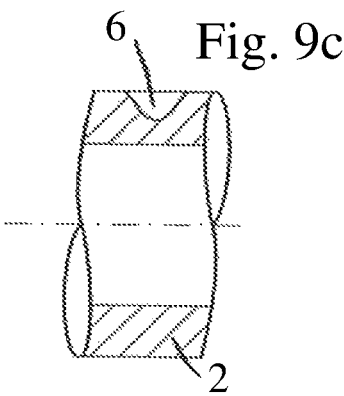
Fig. 9c
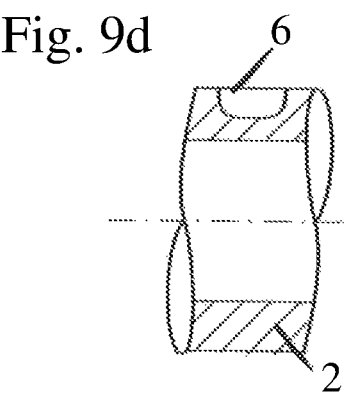
Fig. 9d
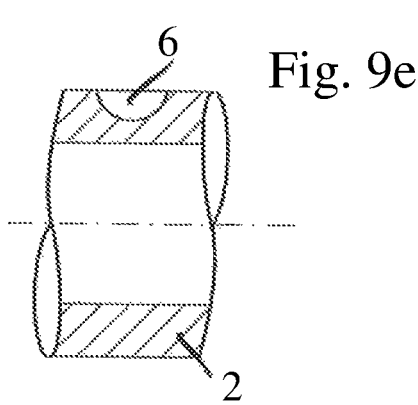
Fig. 9e

PLASTICIZING UNIT INCLUDING A THERMAL SEPARATING DEVICE AND AN ACTIVE TEMPERING DEVICE

BACKGROUND OF THE INVENTION

The present invention concerns a plasticizing unit for a molding machine, and a molding machine with such a plasticizing unit.

Depending on the material a tempering of the plasticizing cylinder in the form of a cooling or a heating can be necessary.

In the case of generic molding machines, the material to be plasticized (p. e. plastic granulate or powder, metal powder, etc.) is subjected to shear forces which is accompanied with heat development. This can have the disadvantageous effect that the material to be plasticized can partly melt or stick together in the area of the filling opening and in the feeding zone, whereby the grain size changes in the case of a granular material, which influences the feeding behavior in an unpredictable way. It can even lead to a blocking of the filling opening by the melted material.

It is already known to provide the filling opening with an active tempering device and to additionally arrange a thermal separating device between the feeding zone and the filling opening. Such a plasticizing unit is for example disclosed in the WO 2008/000613 A1.

It is disadvantageous that with the active tempering device shown in the above mentioned document, the temperature of the filling opening can only vary in a very small range.

Generic plasticizing units for a molding machine with a plasticizing cylinder can comprise a user-operable adjusting device for adjusting a position of a nozzle of the plasticizing cylinder. Here, the problem exists that due to an operating error of the adjusting device, unacceptably high mechanical tensions can occur in the plasticizing cylinder, which can be particularly problematic in combination with a thermal separating device.

SUMMARY OF THE INVENTION

The object of the invention is the provision of a generic plasticizing unit in which
  without the necessity of constructively changing the plasticizing cylinder the filling opening can be tempered strongly different and/or
  an occurrence of unacceptably large mechanical tensions by an operating error of an adjusting device are prevented, and
a molding machine with such a plasticizing unit.

This object is attained by a plasticizing unit for a molding machine and a molding machine with such a plasticizing unit.

Examples for tempering mediums are liquids, particularly water or oil.

The creation of a turbulent flow in the at least one tempering conduit can be reached in various ways (alone or in an arbitrary combination):
  The at least on tempering conduit can be formed in such a way that a Reynolds number larger than 2300 is achieved. Constructively, this can be reached by forming the at least one tempering conduit as rough as possible, or by coating in such a way that the roughness of the surface which comes in contact with the tempering medium is increased.
  The feeding device can feed the tempering medium with a pressure and/or a velocity which are/is sufficient for a turbulent flow.
  A device for creating a turbulent flow can be arranged in at least one section of the at least on tempering conduit. In this case, it can be, for example, a mechanical element, an ultrasonic sensor, a magnetic field when using a conductive medium as the tempering medium, etc.

Preferably, the at least one tempering conduit is arranged at least section-wise in a jacket of the plasticizing cylinder and/or is arranged at least section-wise in a structural component—preferably a tempering ring—arranged on the plasticizing cylinder.

Preferably, the at least one tempering conduit runs over a part of the circumference of the plasticizing cylinder, preferably only over a part of the circumference of the plasticizing cylinder. If the at least one tempering conduit runs only over a part of the circumference of the plasticizing cylinder, there remains still enough space for the arrangement of various construction elements such as connections, sensors and the like also in that area of the plasticizing cylinder in which the at least one tempering unit is running.

At least one galvanic anode (which prevents a corrosion of the at least one tempering conduit) can be arranged in the at least one tempering conduit. This involves the advantage that the galvanic anode is integrated in the at least one tempering conduit and that the tempering medium flows around and directly electrically contacts the material of the plasticizing cylinder (without the necessity of establishing a separate electric connection).

Preferably, a plug which seals the at least on tempering conduit is formed as a galvanic anode. The galvanic anode thus serves also as a plug.

Preferably, the thermal separating device is formed in the form of a thermal separating groove. This represents a constructively particularly advantageous possibility to reduce a heat flow from the feeding zone into the area of the filling opening, because in this way the thermal separating device is integrated in the plasticizing cylinder and air represents a good thermal isolator.

The functions of the thermal separating groove and the at least on tempering conduit can be connected. For example, the thermal separating groove comprises a structural component, preferably a tube, which comprises the at least one tempering conduit, or the thermal separating groove together with a cover forms the at least one tempering conduit. The tempering conduit can still be formed further in the direction of the filling opening. This means, at least in a section, the tempering conduit is included or incorporated in the thermal separating groove.

Preferably, the thermal separating groove is formed in the form of segments which are distanced from each other in a circumferential direction of the plasticizing cylinder. This increases the mechanical stability of a plasticizing cylinder provided with a thermal separating groove.

The form of the thermal separating groove can be chosen in such a way that a maximal mechanical tension of the plasticizing cylinder stays below a yield strength of the material of the plasticizing cylinder. Examples for possible forms of the thermal separating groove are:
  the separating groove has a constant radius of curvature, or
  the separating groove has a varying radius of curvature (for example, a triangle with a radius in the lowest point, clothoids, curved flanks, and a straight running groove basis)

A variant of the invention concerns a plasticizing unit for a molding machine comprising a plasticizing cylinder and an adjusting device for adjusting a position of a nozzle of the plasticizing cylinder, wherein the adjusting device can be operated by an operator. There, the adjustment of the plasticizing cylinder, which adjustment can be made via the adjustment device, is limited in such a way that during operation mechanical tensions in the plasticizing cylinder are held below a predetermined value. This can be reached in various manners:

The adjustment device can be formed motor-driven, and the adjustment which can be made via the adjustment device is limited in a control of the adjustment device.

The adjustment of the plasticizing cylinder which can be made by the adjustment device is limited by a mechanical limit stop for the adjusting device of for the plasticizing cylinder, and the mechanical limited stop is placed in such a way that in the case of an impact of the adjustment device or of the plasticizing cylinder, the mechanical tensions are limited on an acceptable value.

Adjustment of the plasticizing cylinder which can be made by the adjusting device is limited by a contouring of a mechanical actuator of the adjusting device. For example, the dimensioning (radius and eccentricity) of an actuator which is formed as an eccentric tappet can be chosen correspondingly small or in the case of an actuator formed as a thread screw the length of a thread, in which the thread screw is screwed in, can be limited or a length of the thread screw itself can be limited correspondingly.

This variant of the invention is particularly advantageous in combination with the first variant of the invention, in particular then if the thermal separating zone is formed as a separating groove as in such a case the mechanical stability of the plasticizing cylinder is already reduced by the existence of the separating groove.

Tensions in the mass or plasticizing cylinder generally can occur based on the following phenomena:

Tensile stress: The tensile stress is particularly triggered based on the injection force. The tensile stress extends axially along the whole barrel which forms the plasticizing cylinder.

Elongation: Elongations particularly occur based on the injection pressure in the front section of the plasticizing cylinder, in particular in the area of the flange.

Bending: Bendings of the plasticizing cylinder particularly occur because of the centering of the nozzle of the plasticizing (on the mounting plate).

Thermal tension: Thermal tensions occur based on the temperature differences between the first heating zone and the cooling zone in the feeding section.

The predefined value of the mechanical tensions is calculated or determined depending on at least one of these values. Preferably, several or even all values (tensile stress, elongation, bending and/or thermal tension) build the bases for the calculation. Then, via the adjustment device, the position of the nozzle of the plasticizing cylinder is limited depending on the predetermined value of the mechanical tension. Here, it shall be mentioned as an example that the mechanical actuator (eccentric tappet) comprises a mechanical limit stop (maximal eccentricity) so that the determined maximal mechanical tension cannot be exceeded. The calculation of the maximal eccentric value preferably requires a collective calculation of all tensions—particularly in the area of the thermal separating groove.

The maximal mechanical tensions occur particularly in the thermal separating device (separating groove) and in the bore of the tempering device (thermal cooling). Particularly here occur the tensile stress, the bending, and the thermal tensions. Especially the latter shall not be neglected based on the high thermal gradient in this area.

In order to keep the tensions as low as possible, the form of the separating groove and the kind of the geometry of the bore should be adapted to all tension situations.

BRIEF DESCRIPTION OF THE DRAWINGS

Embodiments of the invention are discussed by reference to the figures, wherein:

FIG. 8 shows a sectioning through a further embodiment of a plasticizing cylinder of the FIG. 1 across the longitudinal axis of the plasticizing cylinder, FIG. 9a-e show further sectionings through different embodiments of the plasticizing cylinder of the FIG. 1 in the direction of the longitudinal axis of the plasticizing cylinder.

DETAILED DESCRIPTION OF THE INVENTION

Figure 1:
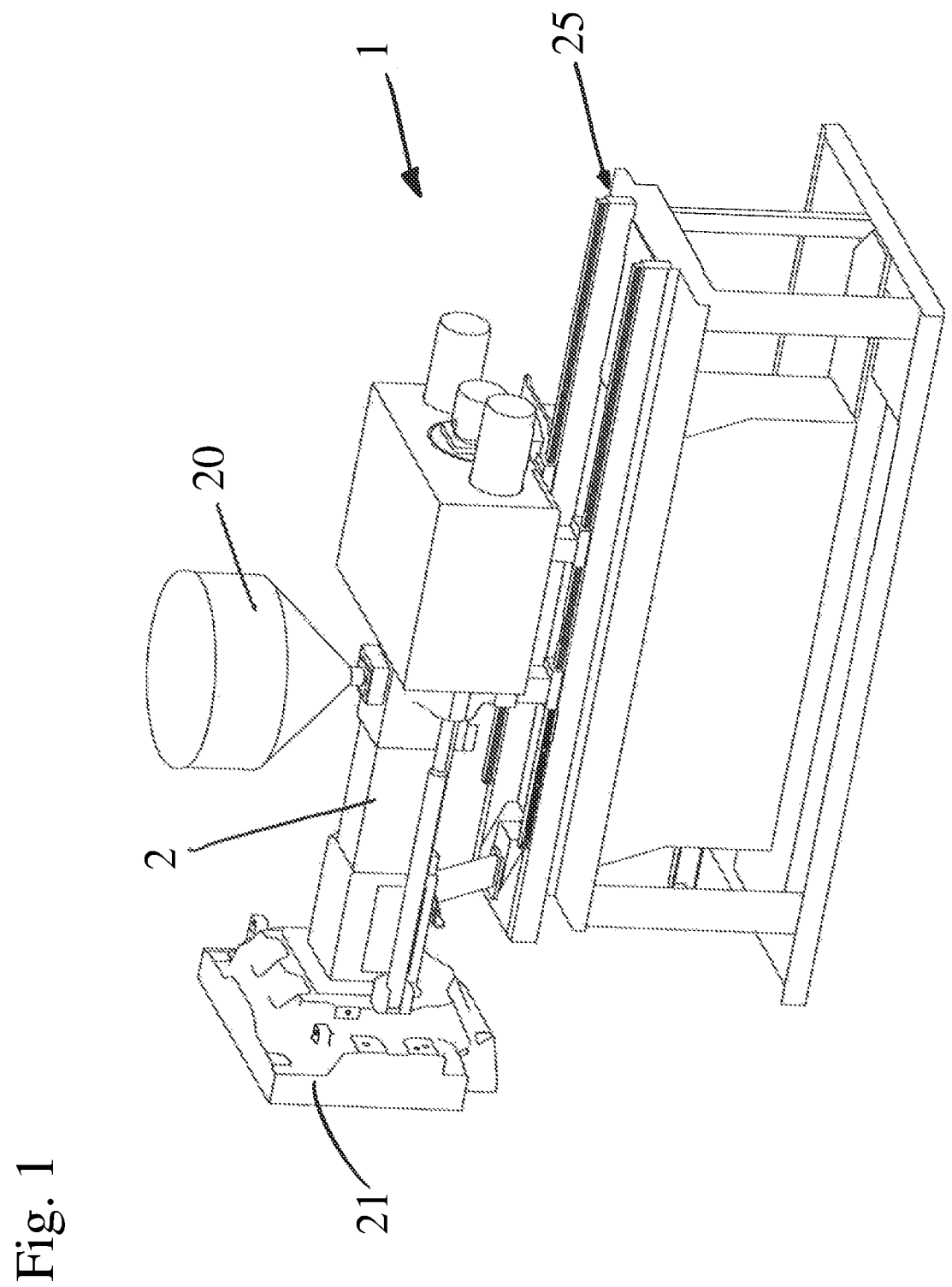
FIG. 1 shows a plasticizing unit according to the invention in an isometric view with a frame, a guide rail and an adjustment device.

FIG. 1 shows a plasticizing unit 1 of a molding machine (here: injection molding machine) according to the invention with a plasticizing cylinder 2, a feed hopper 20 for introducing the material to be plasticized, and a machine bed 25. Moreover, a mounting plate 21 for a forming tool is shown which forming tool together with at least one further forming tool—which is arranged on at least one further mounting plate (not shown)—forms a cavity in which the plasticized material can be injected via a nozzle 10 of the plasticizing cylinder 2. The mounting plate 21 is part of a closing unit of a molding machine, although the closing unit is not shown because it belongs to the state of the art. The feed hopper 20 is in connection with the filling opening 4 (not visible in FIG. 1) which is formed on the plasticizing cylinder 2 (cf. FIG. 5a). Directly after the filling opening 4 follows (in FIG. 1 on the left side below the feed hopper 20) a feeding zone 3 of the plasticizing cylinder 2 (see FIG. 5a). The plasticizing cylinder 2 loosely abuts the machine bed 25 in the area of the nozzle 10, and can be adjusted slightly relative to the machine bed 25.

Figure 2:
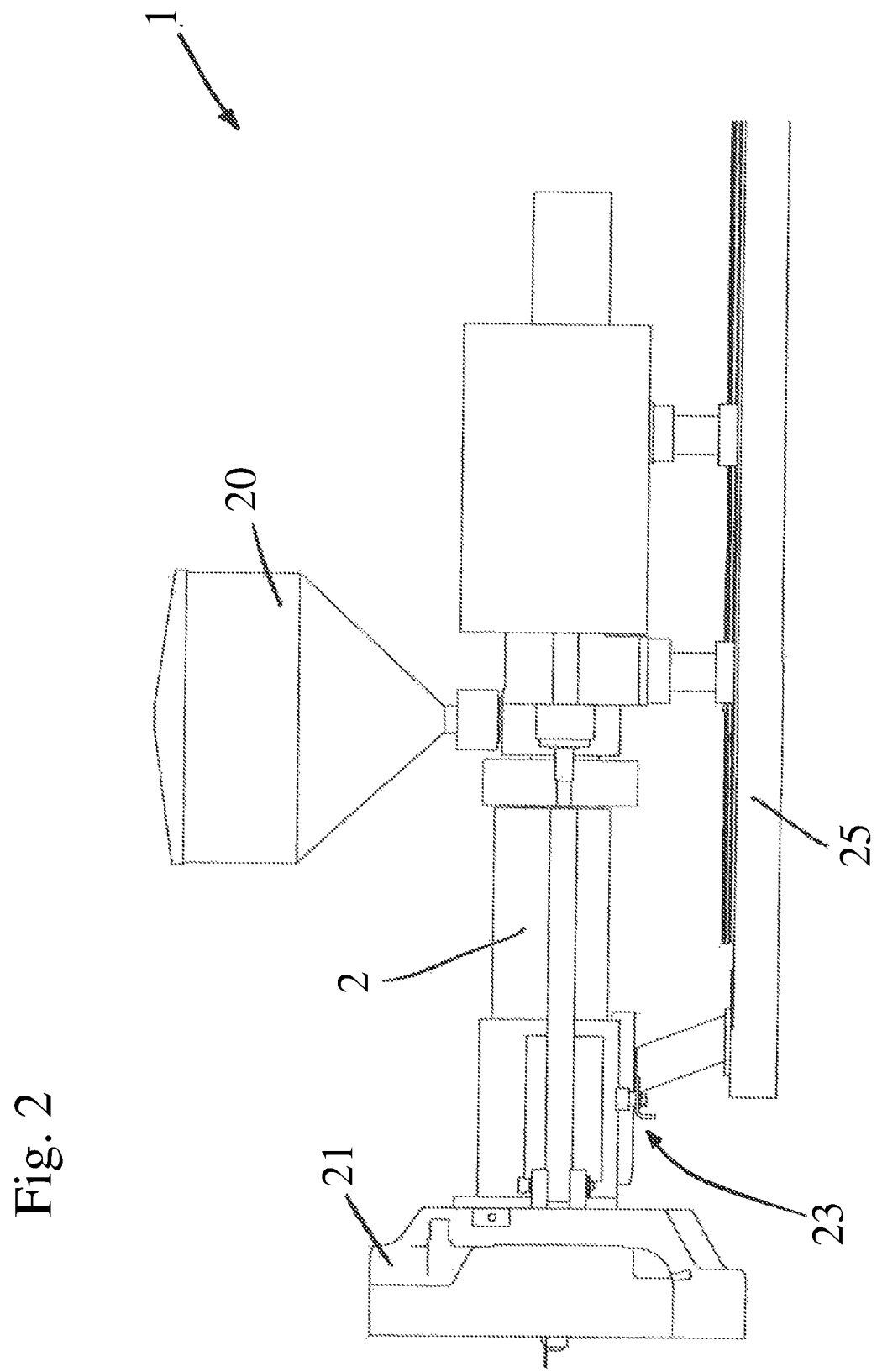
FIG. 2 is a side view of the FIG. 1.
Figure 3:
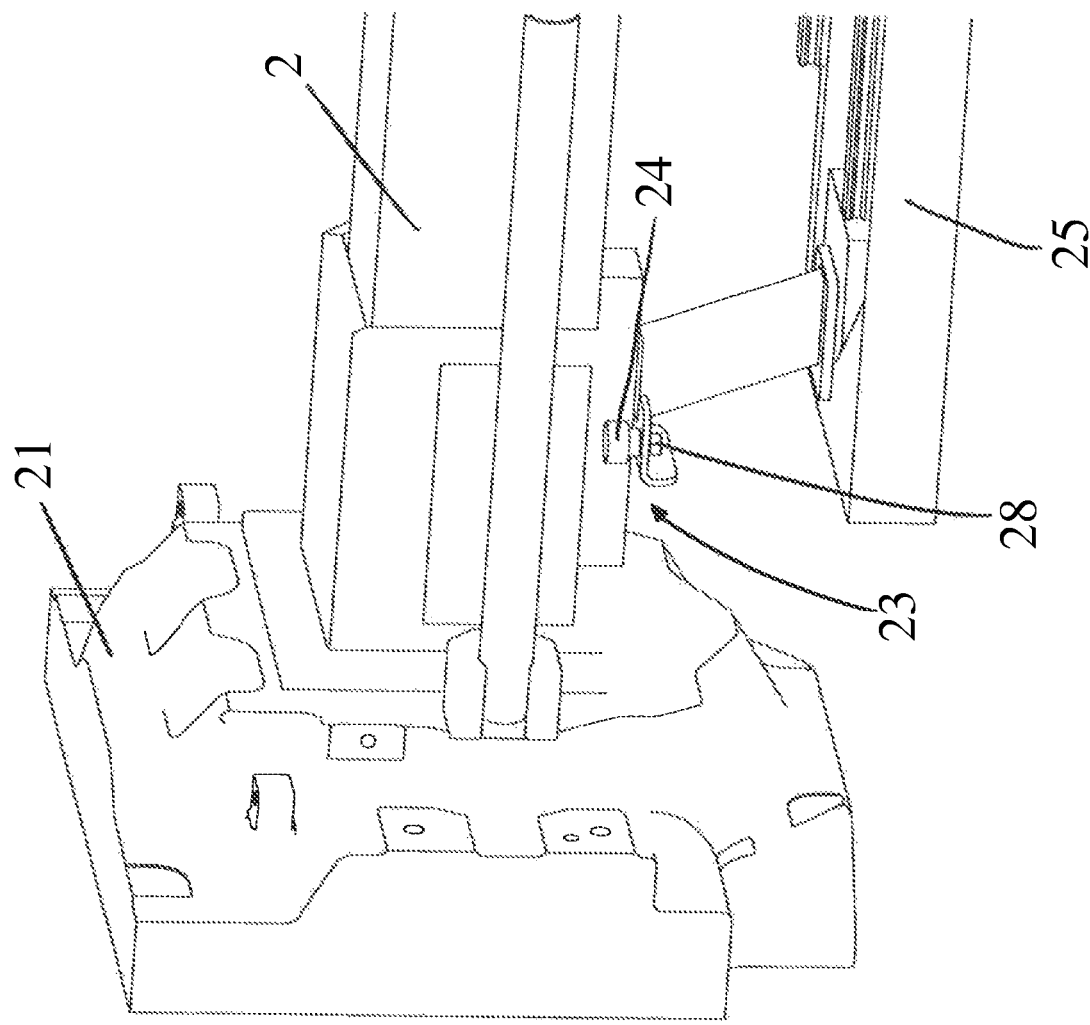
FIG. 3 is a detailed view of the FIG. 1.
Figure 4:
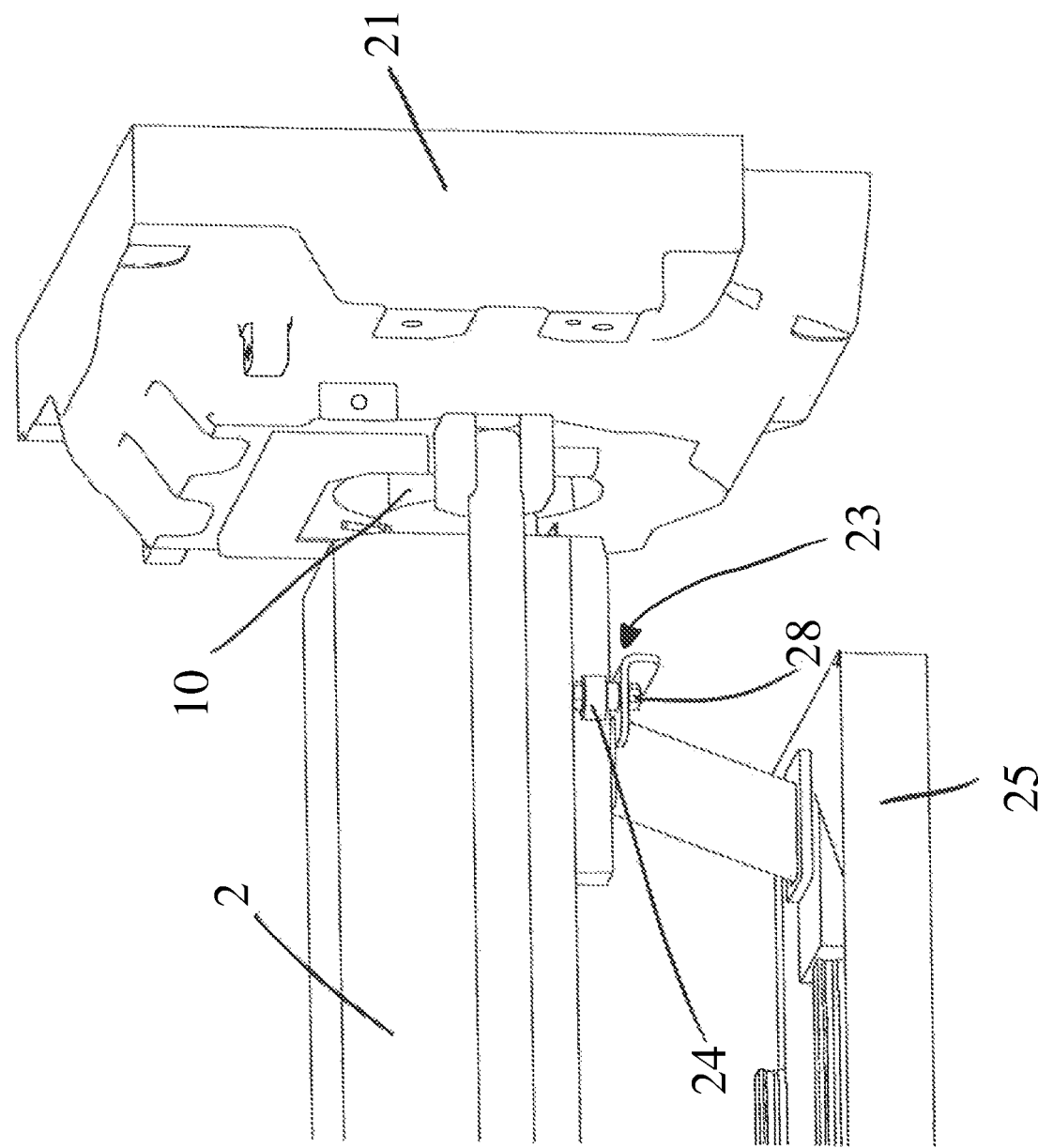
FIG. 4 is a further detailed view of the FIG. 1, FIG. 5a, 5b each is a schematic view of a detail of the plasticizing unit according to the invention with a tempering device.

FIG. 2 shows a part of an adjustment device 23 which is here arranged on both sides of the plasticizing cylinder (cf. FIGS. 3 and 4) and which serves for an adjustment of the position of the nozzle 10 of the plasticizing cylinder in a horizontal plane. A mechanical actuator 24 in the form of a pivotally supported eccentric tappet is provided in each case, wherein the dimensioning (radius and eccentricity) of each of the two eccentric tappets is limited in such a way that during operation mechanical tensions in the plasticizing cylinder 2 are held below a predetermined value also in the case of the largest possible adjustment. When actuating the eccentric tappets, the nozzle 10 is moved a little more in or out of the sheet level depending on the chosen extent of the rotation. A rotation of each eccentric tappet can here be effected by a hexagonal bolt head/nut 28. Also other engaging possibilities for an adjustment tool are possible of course.

Figure 5A:
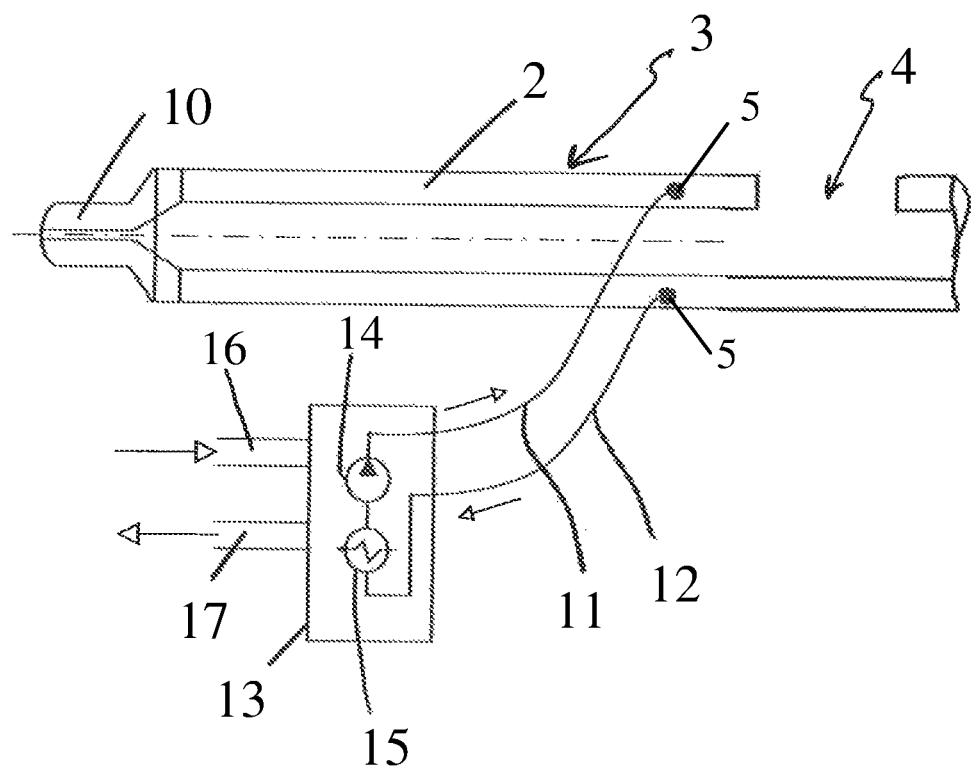

In FIG. 2 not visible, because arranged inside a protection cover of the plasticizing cylinder, is an adjustment device 23 which serves for an adjustment of the position of the nozzle 10 of the plasticizing cylinder 2 in a vertical plane. The adjustment device 23 for the adjustment in the horizontal plane can comprise a pivotally supported eccentric tappet and acts from below of the plasticizing cylinder 2 onto the plasticizing cylinder 2. The dimensioning (radius and eccentricity) of the eccentric tappet is limited in such a way that during operation, mechanical tensions in the plasticizing cylinder 2 are held below a predetermined value also in the case of largest possible adjustment. A rotation of each eccentric tappet can here be effected by a hexagonal bolt head/nut 28. Also other engaging possibilities for an adjustment tool are possible of course. FIG. 5*a* shows a first example for an active tempering device for the filling opening 4 of the plasticizing cylinder 2. A feeding device 14 (here formed as a pump) and a heat exchanger 15 are arranged in a housing 13 of the tempering device. Tempered tempering medium is fed from the feeding device 14 via a flow supply line 11 of the tempering device to at least one tempering conduit 5 which is not visible here. After flowing through the at least one tempering conduit 5, the tempering medium is brought to the heat exchanger 15 via a flow return line 12. The heat exchanger 15 is held on a desired temperature in a per se known manner via an inflow 16 and an outlet 17. The heat exchanger 15 is of course not strictly required.

A feeding device 14 formed as a pump is not strictly required. The needed pressure for the tempering medium can originate, for example, from an operating network or from a public network for the tempering medium (preferably water or oil). In this case, the operating network or the public network forms the feeding device 14.

Figure 5B:
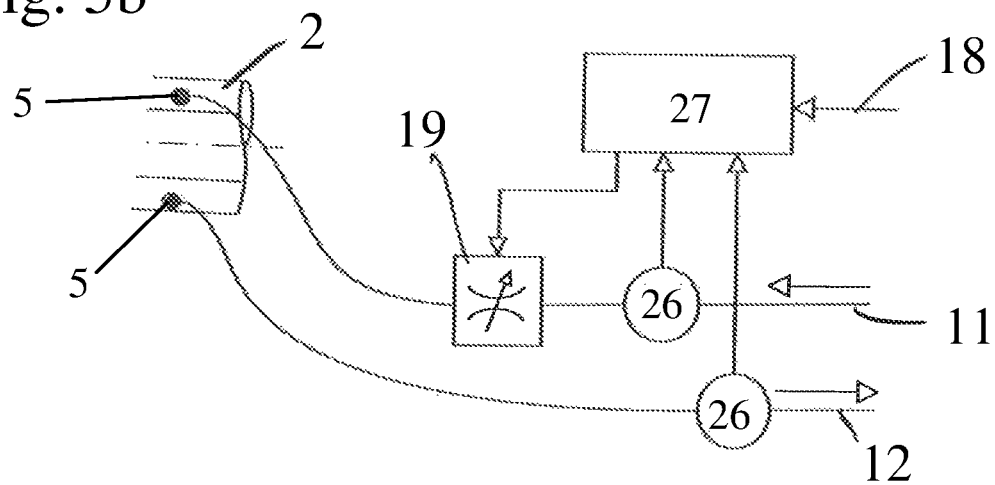

FIG. 5*b* shows a further embodiment of an active tempering device for the filling opening 4 of the plasticizing cylinder 2. A flow regulator 19 controlled by a controller 27 is arranged in the flow line 11, with which the throughput of the tempering medium through the at least one tempering conduit 5 can be regulated. The controller 27 can be in a connection with a machine control of the molding machine via a control line 18 or can be formed as a part of the machine control. Sensors 26 (for example, for sensing the throughput, pressure and/or temperature) are arranged in the flow supply line 11 and in the flow return line 12. The controller 27 can feed the tempering medium with a pressure and/or a velocity which are/is sufficient for a turbulent flow in the at least one tempering conduit 5.

Figure 6:
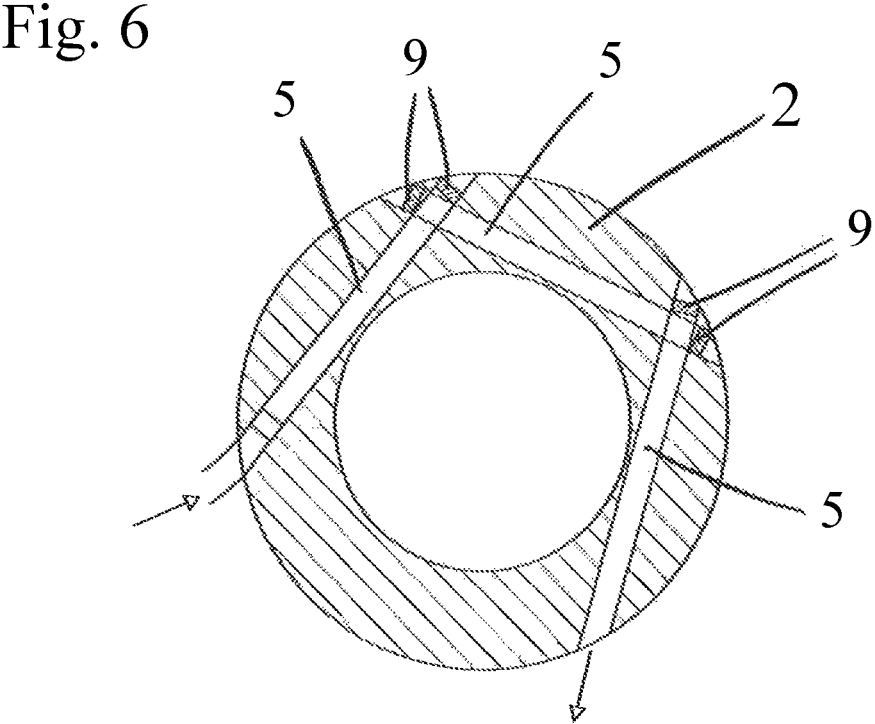
FIG. 6 shows a sectioning through the plasticizing cylinder of FIG. 1 across the longitudinal axis of the plasticizing cylinder.

The embodiments according to FIGS. 5*a* and 5*b* can also be used in combination. FIG. 6 shows a cross section across the longitudinal axis of the plasticizing cylinder 2 in an area between the feeding zone 3 and the filling opening 4. It is visible that here the tempering conduit 5 is formed in the form of three straight segments and namely in such a way that the tempering conduit 5 runs only via a part of the circumference of the plasticizing cylinder 2. The individual sections are closed to the outside by plugs 9 in order that no tempering medium can leak out. The diameter of the individual sections can be chosen in such a way that for the used tempering medium, a turbulence occurs in a specific velocity range. For supporting, the surface of the tempering conduit 5 can be formed roughened or correspondingly coated.

Figure 7:
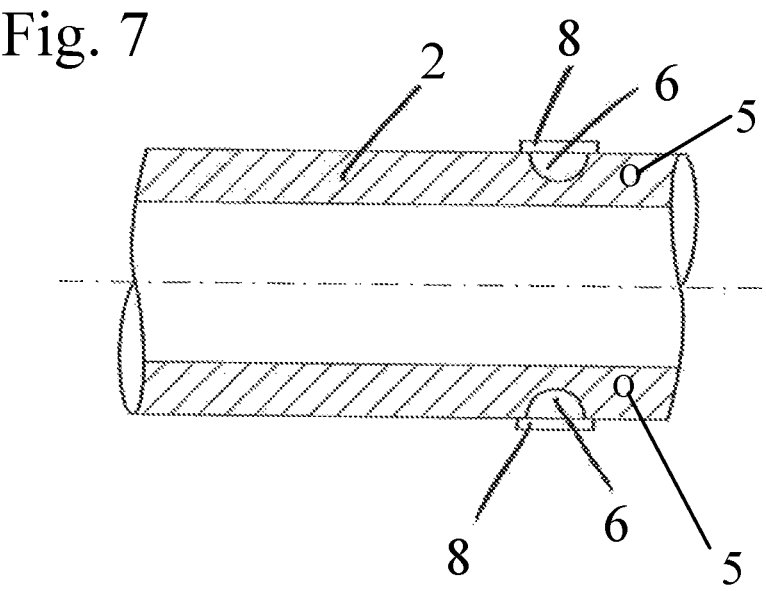
FIG. 7 shows a further sectioning through the plasticizing cylinder of the FIG. 1 in direction of the longitudinal axis of the plasticizing cylinder.

In the embodiment according to FIG. 7, a thermal separating device comprising a thermal separating groove 6 together with a cover 8 can form the at least one tempering conduit 5. Alternatively, the plasticizing cylinder 2 can be provided with the thermal separating device comprising the thermal separating groove 6 arranged and formed separate from the active tempering device comprising the at least one tempering conduit 5, as shown in FIG. 7.

In the embodiment according to FIG. 8, a plug 9 which closes the at least one tempering conduit 5 is formed as a galvanic anode 7.

FIGS. 9*a* to 9*e* show different designs of a thermal separating device in the form of a separating groove 6:

In FIG. 9*a* the separating groove 6 has a constant radius of curvature.

In FIG. 9*b* the separating groove 6 has a constant radius of curvature which is chosen larger than in FIG. 9*a*.

In FIG. 9*c* the separating groove 6 has a varying radius of curvature in form of a triangle with a radius in the lowest point.

In FIG. 9*d* the separating groove 6 has a varying radius of curvature with bent flanks and a straight running groove basis.

In FIG. 9*e* the separating groove 6 has a varying radius of curvature in the form of a clothoid.

Figure 10:
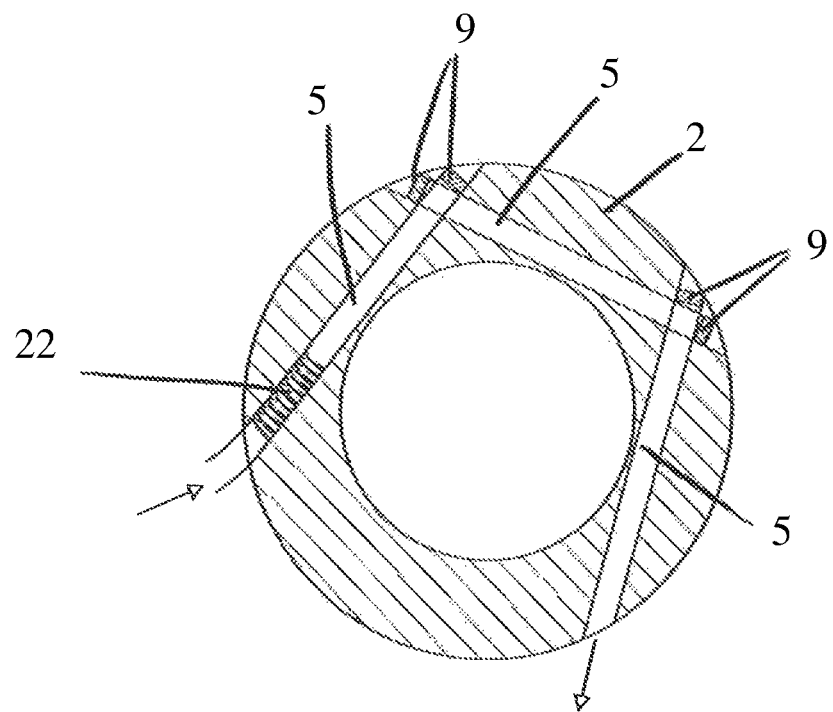
FIG. 10 shows a sectioning through a further embodiment of a plasticizing cylinder of the FIG. 1 across the longitudinal axis of the plasticizing cylinder.

In FIG. 10 a device 22 for the creation of a turbulent flow is arranged in a section of the at least one tempering conduit 5.

LIST OF REFERENCE SIGNS 1 plasticizing unit
2 plasticizing cylinder
3 feeding zone
4 filling opening
5 tempering conduit
6 separating groove
7 galvanic anode
8 cover
9 plug
10 nozzle of the plasticizing cylinder
11 flow line of the tempering device
12 return line of the tempering device
13 housing of the tempering device
14 feeding device
15 heat exchanger
16 inflow of the heat exchanger
17 outlet of the heat exchanger
18 control line
19 flow regulator
20 feed hopper
21 mounting plate
22 device for the creation of a turbulent flow
23 adjustment device
24 actuator of the adjustment device
25 machine bed
26 sensors
27 control of the flow regulator
28 hexagonal nut/bolt

The invention claimed is:

1. A plasticizing unit for a molding machine, comprising:
a plasticizing cylinder having a feed zone and a cylinder wall with a filling opening extending entirely through the cylinder wall in a radial direction, the filling opening being arranged adjacent to the feed zone to receive material to be plasticized;
a feed hopper having an inlet opening and an outlet opening communicating with the filling opening of plasticizing cylinder;
a thermal separating device arranged between the feed zone and the filling opening, the thermal separating device comprising a thermal separating groove in an outer surface of the cylinder wall and formed separate from the filling opening, the thermal separating groove extending only partially through the cylinder wall in the radial direction; and
an active tempering device for the filling opening, the active tempering device comprising a tempering conduit located at the filling opening of the cylinder wall to adjust a temperature of the cylinder wall, the tempering conduit being configured to allow a tempering medium to turbulently flow through the tempering conduit during operation of the active tempering device;
wherein the thermal separating groove is arranged and formed separate from the active tempering device.

2. The plasticizing unit according to claim 1, wherein the tempering conduit is formed such that the Reynolds number is larger than 2300.

3. The plasticizing unit according to claim 1, wherein the active tempering device includes a feeding device for feeding the tempering medium through the tempering conduit.

4. The plasticizing unit according to claim 3, wherein the feeding device is configured to feed the tempering medium with a pressure and/or a velocity sufficient for a turbulent flow.

5. The plasticizing unit according to claim 1, wherein the active tempering device includes a device for creating a turbulent flow arranged in at least one section of the tempering conduit.

6. The plasticizing unit according to claim 5, wherein the device for creating turbulent flow is a mechanical element.

7. The plasticizing unit according to claim 1, wherein the tempering conduit extends over at least a part of the circumference of the plasticizing cylinder.

8. The plasticizing unit according to claim 7, wherein the tempering conduit extends over only a part of the circumference of the plasticizing cylinder.

9. The plasticizing unit according to claim 1, wherein a galvanic anode is arranged in the tempering conduit.

10. The plasticizing unit according to claim 9, wherein the galvanic anode is formed as a plug to seal the tempering conduit.

11. The plasticizing unit according to claim 9, wherein the tempering conduit is within the cylinder wall.

12. The plasticizing unit according to claim 1, wherein the thermal separating groove is formed in segments separated from each other in circumferential direction of the plasticizing cylinder.

13. The plasticizing unit according to claim 1, wherein the thermal separating groove is formed such that a maximal mechanical tension of the plasticizing cylinder stays below a yield strength of a material of the plasticizing cylinder.

14. The plasticizing unit according to claim 1, further comprising an adjustment device for adjusting a position of a nozzle of the plasticizing cylinder, the adjustment device to be operated by an operator, wherein the adjustment device is configured such that adjustment of the plasticizing cylinder via the adjustment device is limited such that during operation, mechanical tensions in the plasticizing cylinder are held below a predetermined value.

15. The plasticizing unit according to claim 14, wherein the adjustment device has a mechanical actuator configured so that adjustment of the plasticizing cylinder to be made by the adjustment device is limited by a contouring of the mechanical actuator.

16. A molding machine comprising the plasticizing unit according to claim 14.

17. A molding machine comprising the plasticizing unit according to claim 1.

18. The plasticizing unit according to claim 1, wherein an inner surface of the tempering conduit contacting the tempering medium is coated such that a roughness of a coated inner surface of the tempering conduit is greater than a roughness of an uncoated inner surface of the tempering conduit.

* * * * *